United States Patent
Dugonjic-Bilic et al.

(10) Patent No.: US 10,934,479 B2
(45) Date of Patent: Mar. 2, 2021

(54) METHOD FOR REDUCING THE VISCOSITY OF VISCOSIFIED FLUIDS FOR APPLICATIONS IN NATURAL GAS AND OIL FIELDS

(71) Applicant: TouGas Oilfield Solutions GmbH, Frankfurt am Main (DE)

(72) Inventors: Fatima Dugonjic-Bilic, Offenbach (DE); Jasmin Meurer, Mainz (DE); Marita Neuber, Dreieich (DE)

(73) Assignee: TouGas Oilfield Solutions, GmbH, Frankfurt am Main (DE)

( * ) Notice: Subject to any disclaimer, the term of this patent is extended or adjusted under 35 U.S.C. 154(b) by 36 days.

(21) Appl. No.: 15/776,991

(22) PCT Filed: Nov. 18, 2015

(86) PCT No.: PCT/EP2015/076934
§ 371 (c)(1),
(2) Date: May 17, 2018

(87) PCT Pub. No.: WO2016/096302
PCT Pub. Date: Jun. 23, 2016

(65) Prior Publication Data
US 2018/0346803 A1    Dec. 6, 2018

(30) Foreign Application Priority Data

Dec. 15, 2014 (EP) .................... 14004215

(51) Int. Cl.
| | | |
|---|---|---|
| *C09K 8/035* | (2006.01) | |
| *C09K 8/88* | (2006.01) | |
| *C09K 8/68* | (2006.01) | |
| *C09K 8/90* | (2006.01) | |

(52) U.S. Cl.
CPC ............. *C09K 8/882* (2013.01); *C09K 8/035* (2013.01); *C09K 8/68* (2013.01); *C09K 8/88* (2013.01); *C09K 8/90* (2013.01); *C09K 2208/26* (2013.01)

(58) Field of Classification Search
CPC ...... C09K 2208/26; C09K 8/035; C09K 8/68; C09K 8/88; C09K 8/882; C09K 8/90
See application file for complete search history.

(56) References Cited

U.S. PATENT DOCUMENTS

| | | |
|---|---|---|
| 4,412,934 A | 11/1983 | Chung et al. |
| 7,216,704 B2 | 5/2007 | Hanes, Jr. et al. |
| 7,923,417 B2 | 4/2011 | Sanders et al. |
| 7,928,040 B2 | 4/2011 | Sanders et al. |
| 8,415,278 B2 | 4/2013 | Sanders et al. |
| 2002/0134687 A1* | 9/2002 | Nakajima ............... A61L 2/186 205/466 |
| 2002/0194852 A1* | 12/2002 | Furuta ...................... F25D 3/02 62/1 |
| 2008/0058576 A1* | 3/2008 | Shafer ...................... C02F 9/00 588/300 |
| 2009/0221453 A1 | 9/2009 | Mukhopadhyay et al. |
| 2012/0241158 A1* | 9/2012 | Seshadri .................. C09K 8/68 166/308.1 |

FOREIGN PATENT DOCUMENTS

WO    WO 2011/071797 A1    6/2011

* cited by examiner

*Primary Examiner* — Alicia Bland
(74) *Attorney, Agent, or Firm* — Hammer & Associates, P.C.

(57) ABSTRACT

A method to reduce the viscosity of viscosified treatment fluids is disclosed herein. The method includes a water soluble polymer, a breaker system containing at least one aliphatic azo-compound, mixing the viscosified treatment fluid and the breaker composition and allowing the viscosified treatment fluid and the breaker composition to interact whereby the viscosity of the viscosified treatment is reduced. The application of the process in the production of oil and gas and to the treatment fluids is also discussed.

6 Claims, No Drawings

METHOD FOR REDUCING THE VISCOSITY OF VISCOSIFIED FLUIDS FOR APPLICATIONS IN NATURAL GAS AND OIL FIELDS

The present invention relates to a method to reduce the viscosity of viscosified treatment fluids comprising a water soluble polymer as viscosifying agent, optionally a crosslinker for the water soluble polymer, and a breaker system containing an aliphatic azo-compound as breaker, mixing the viscosified treatment fluid and the breaker composition and allowing the viscosified treatment fluid and the breaker composition to interact whereby the viscosity of the viscosified treatment is reduced. The invention also relates to the application of the process in the production of oil and gas and to the treatment fluids per se.

The resources for fossil fuels are highly exploited and also limited. With new and improved technologies these resources for oil and gas can be further exploited and unconventional reservoirs can be accessed. With the increasingly challenging conditions for the oil and gas production the requirements for the equipment and the chemicals also become more and more demanding.

Viscosified fluids are very common and widely used in almost all processes of the oil and gas production. They are applied for very different purposes and have to ensure various properties of the fluid:

- In drilling the bore hole a mud is circulated that lubricates and cools the drill head, disperses the cuttings and transports them upwards.
- In cementing the casing the fluid has to ensure a homogeneous transport of the cement particles downhole and to prevent sedimentation until the mixture is hardened.
- Fluids are viscosified to reduce friction caused by turbulent flow.
- Enhanced oil recovery of highly exploited formations can be achieved by flooding with viscosified water.
- Viscosified fluids are applied in water bearing formations to control the water and oil flow (relative permeability modifier) or to separate water rich area form oil containing area (water shut off)
- In well stimulation processes viscosified fluids transport solid particles (proppants) downhole into freshly created cracks in the formation. They prevent the sedimentation of the proppants and possibly blockade of the bore hole.
- Viscosified acids are also used in well stimulation processes. So it is ensured that the acid reacts slowly and can reach the desired regions especially in horizontal wells.

Water based fluids are typically made viscous by the addition of water soluble polymers. The polymers can be natural based polymers or synthetic polymers. The polymers fulfil various tasks. Amongst others they function as rheology modifier, fluid loss additive, friction reducer, viscosifier or precursor for crosslinked hydrogels.

As natural based polymers typically polysaccharides or modified polysaccharides are used. For instance, suitable hydratable polysaccharides include starch or its derivatives, galactomannan gums, glucomannan gums, cellulosic derivatives, preferably carboxymethyl cellulose; cellulose ether, preferably hydroxyethyl cellulose; guar gums or its derivatives, preferably hydroxyalkyl guar, carboxyalkyl guar, and carboxyalkyl hydroxyalkyl guar or hydrophobically modified guar alginates, carrageenans, tragacanth gums, glucan gums and xanthan gums.

All the natural based polymers have in common that due to their glycosidic bonds they are not stable at elevated temperatures and under acidic conditions. They are also easily attacked and degraded by bacteria and their dispersions and solutions have to be protected by biocides even when they are handled or stored only for short periods of time. Furthermore the availability of natural based polymers may depend on weather conditions and crop yield. This dependence impacts the availability and the price of natural based polymers.

Therefore often synthetic polymers based on acrylamide are used for applications in the oil and gas production as substitutes for natural based polymers. They are independent from bad weather conditions and distinguish themselves with marked better temperature and chemical stability and resistance against bacterial degradation.

Acrylamide can be copolymerized with a broad variety of monomers to adjust the properties of the resulting water soluble polymer. Amongst others, ethylenically unsaturated carboxylic, sulfonic or phosphonic acids, their esters, unsubstituted or N- and N,N-substituted derivatives of amides of ethylenically unsaturated carboxylic acids, N-substituted (cyclic) derivatives of ethylenically unsaturated amides can be used.

The viscosity of fluids containing polymers as thickener can be further increased by crosslinking the polymer chains to form a hydrogel, that is a three dimensional network of extremely high molecular weight.

Typically, polyvalent cations of group IIIA, IVB, VB, VIB, VIIB and/or VIIIB of the periodic table of the elements are used as crosslinking compound, preferred are compounds of boron, zirconium, titanium, aluminum or chromium, for both synthetic polymers and natural polymers.

The viscosity of the viscosified fluids or of the crosslinked hydrogels may range from almost as thin as water (1 mPas) to several 1000 mPas.

For some applications it is necessary to reduce the viscosity of the fluid after a desired time. Especially in well stimulation processes the viscosity of the frac fluid is reduced to ensure the removal of the fluid from the bore hole to prevent blockage of the pores and fractures by the highly viscous gel and to minimize formation damage.

For the reduction of the viscosity of the fluid typically the water soluble polymer is degraded by so called breakers. The breakers cleave the high molecular polymer chain into fragments of lower molecular weight.

Solutions of high molecular weight polymers show a high viscosity. Cleaving bonds in the polymer chain gives fragments of lower molecular weight; the viscosity of their solution is reduced. The viscosity of polymer solutions is therefore related to the molecular weight of the polymer.

Analytically the degradation of the polymer chain or network can be characterized by rheological methods in determining the viscosity of the polymer solution. As polymer solutions typically are non-Newtonian fluids it is important to compare the results only when the methods for the determination of the viscosity were exactly the same.

The polymer degradation can be followed either directly in a rheometer or by determination of the viscosity of the polymer solution before and after breaking treatment.

Typically, oxidizers, enzymes or acids are used as breakers.

Enzymes are generally used for naturals based polymers in a low temperature range from about 20° C. to 70° C. At higher temperature they denature and become ineffective. Enzymes break selectively glycosidic linkages in polysaccharides, so very specific types of enzymes are used for different types of naturals based polymers. At lower temperature the reaction rate becomes very slow.

Acids also break the glycosidic linkage by hydrolysis. However the breaking process is difficult to control, the chemical compatibility with the viscosified fluid and its additives is difficult and corrosion of the metal equipment may occur.

Synthetic polymers, especially polyacrylamide based polymers are much more stable compared to natural based polymers. Polyacrylamide based polymers are considered to be very resistant towards thermal, acidic, enzymatic or biological degradation. Therefore they typically are used at high temperatures or otherwise harsh conditions. Under harsh conditions oxidative breakers are able to degrade also synthetic polymers.

The use of oxidative breakers is described in the literature for natural based polymers as well as for synthetic, polyacrylamide based polymers. The oxidative breakers have in common that they are able to release hydrogen peroxide that is a strong oxidizing agent. The polymer chain is degraded by oxidative processes.

Typically persulfates are used in the low temperature range up to about 100° C. (212° F.). Sodium persulfate, ammonium persulfate, potassium persulfate are by far the most common oxidative breakers. They are effective in the temperature range that is also ideal for the application of natural based polymers as guar or hydroxypropyl guar for hydraulic fracturing.

At higher temperatures persulfates decompose too fast. At temperatures above 100° C. (212° F.) often bromates are applied. Their use is also described for synthetic polymers at very high temperatures above 150° C. (302° F.). Typical operation conditions of breakers are given for example in G. A. Al-Muntasheri, SPE Western North American and Rocky Mountain Joint Regional Meeting, Denver, Colo., USA, 16-18 Apr. 2014, SPE169552.

For every application the breaker must meet the specific needs. In hydraulic fracturing processes it is important that in the beginning the viscosity of the fluid is high and remains stable for a given time to ensure a proper transport of the proppants into the freshly created fractures. Only after proppant placement the viscosity of the frac fluid should decrease. It is desirable that the viscosity of the fluid then reaches values similar to water in a short time. Furthermore no residues should be left over that could block the fractures and diminish the flow of oil or gas.

The effectivity of every substance that is used as a breaker depends strongly on the conditions, especially on temperature, pH-value and concentrations of the breaker itself as well as of the polymer. Some of the conditions are given by the application and cannot be changed, for example the borehole temperature. Some conditions can be altered at least within certain limits to ensure an effective degradation of the polymers, for example the breaker concentration or the well closure time.

Especially the temperature is important for the breaker effectivity. The rate at which a persulfate molecule breaks into two radicals is temperature dependent. Typically, below 120° F. (49° C.) this process occurs very slowly, and the reaction must be catalysed to obtain acceptable break rates. A variety of catalysts, including various organic amines and inorganic materials, may be used for persulfate breakers. The optimum pH value for persulfate oxidation is around pH 10 at low temperatures (less than 150° F. or 66° C.). Above approximately 200° F. (93° C.), persulfate decomposes fast and cleaves the polymer chains very quickly (i.e. without delay in the breaking process). Therefore, persulfate is typically not recommended as breaker above 200° F. (93° C.).

Therefore, breakers and the breaking conditions must be selected carefully. Premature reduction of viscosity during pumping of the frac fluid can jeopardize the treatment. Width and length of the fractures is influenced in unknown extent and the proppant placement within the fractures is not ensured. On the other hand, inadequate reduction of the fluid viscosity after the pumping can also lead to severe reduction of oil and gas flow due to resistance of the viscous fluid.

The effect of breakers can be adjusted. For higher temperatures breakers can be encapsulated which allows release only after some time and early polymer degradation is prevented thereby.

For lower temperatures the use of activators has been reported in the literature.

It is known from bleaching in laundry and cleaning processes that activators for bleaching agents, e.g. sodium perborate and sodium percarbonate can be used to enable an effective process at low temperatures. Typical activators are mainly N- and O-acyl compounds. They are able to react with hydrogen peroxide that is released from the bleaching agents and form very active peracids.

The most common activator is tetraacetyl ethylendiamine (TAED) that reacts with hydrogen peroxide from the bleaching agent to form peracetic acid. Nonanoyloxy benzenesulfonate (NOBS), dodecanoyl oxybenzenesulfonate (LOBS) or decanoyl oxybenzoic acid (DOBA) allow even lower temperatures. A great variety of N- and O-acyl compounds is claimed as activator for persalts in the open and patent literature, e.g. U.S. Pat. No. 4,412,934 or G. Reinhardt, 5th World Conference on Detergents, edit. A. Cahn, AOCS Publishing, 2003, p. 69 to 74.

Activators are also described for oxidative breakers for processes in the oil and gas production.

U.S. Pat. No. 7,216,704 describes the use of a reducing sugar as activator for oxidative breaker. Further addition of iron salt enhances the breaking of the polymer. The activator is claimed to be useful for temperature below 121° C. (250° F.).

U.S. Pat. No. 7,923,417 claims a method for degrading xanthan at temperatures below 38° C. (100° F.) by using a breaker system comprising a source of hydrogen peroxide and a water soluble alkanoyl donor compound. The activator is selected from the group consisting of ethyl acetate, ethyl acetoacetate, tetraacetylethylendiamin, sodium nonanoyloxybenzenesulfonate and their combinations.

U.S. Pat. No. 8,415,278 also describes a breaker system for xanthan, diutan and succinogycan gums comprising a source of hydrogen peroxide and a water soluble alkanoyl donor compound. The activator is selected from tetraacetylethylendiamin, sodium nonanoyloxybenzenesulfonate and their combinations. The method is useful for applications when the temperature of the formation is less than 38° C. (100° F.).

U.S. Pat. No. 7,928,040 claims a method for degrading xanthan at temperatures below 38° C. (100° F.) by using a breaker system comprising a source of hydrogen peroxide and a chelated transition metal, a chelating agent and a transition metal and their combinations. The chelation agent comprises EDTA, alkali metal salt of EDTA, alkali metal citrate, citric acid, iminodiacetic acid, gluconate, NTS, tetraamidomacrocyclic ligand or their combinations.

U.S. Patent Application No. US 2009/0221453 describes a beaker system for hydratable polymers comprising an oxidizing breaking system and an activator capable of providing a bisulfite ion source. The temperature range for the methods applying the breaker system is from 25° C. to 177° C.

The vast number of literature on breaking of polymers in treatment fluids for oil and gas production and especially on activation of breakers for low temperature makes clear that there is a wish for further improvement. This is especially required for the breaking of synthetic polymers that are much more stable compared to natural based polymers and therefore much more difficult to degrade chemically.

Further challenge for breaking polymers in treatment fluids is the use of formation water or produced water to save fresh water. Typically formation water or produced water contain salts, especially sodium, potassium, calcium and magnesium chlorides, solids and organic compounds that may be dissolved or finely dispersed. Even after treating those brines for reuse e.g. by filtration, salts and dissolved organics remain in the treated water and may cause additional concern when polymers in such natural brines are degraded by oxidative processes.

Strong oxidizing compounds are consumed by chloride from the brine to form chlorine. Chlorine further reacts aggressively with organic compound. Depending on the condition this may help to degrade the polymer but also can give chlorinated organic compounds. Chlorine also attacks metallic parts of the equipment and may cause severe corrosion.

Furthermore the oxidative breaker is consumed by the dissolved organic compounds that are also degraded by oxidative processes. So a larger quantity of breaker is needed to degrade the polymer compared to treatment fluids with fresh water.

Therefore there is a need for breaker for polymers in treatment fluids which are effective at low temperature, able to break natural based polymers as well as synthetic polymers and are tolerant against natural brines containing chlorides and dissolved organics.

Surprisingly it was found that aliphatic azo compounds were very suitable breaker compounds that fulfil the above mentioned requirements for breaking polymers in treatment fluids.

The present invention relates to a treatment fluid comprising a water soluble polymer as viscosifying agent, optionally a crosslinker for the water soluble polymer, and a breaker system containing an aliphatic azo-compound as breaker.

The invention further relates to a method to reduce the viscosity of viscosified treatment fluids comprising a water soluble polymer as viscosifying agent, optionally a crosslinker for the water soluble polymer, and a breaker system containing an aliphatic azo-compound as breaker, mixing the viscosified treatment fluid and the breaker composition and allowing the viscosified treatment fluid and the breaker composition to interact whereby the viscosity of the viscosified treatment is reduced.

The invention also relates to the application of the process in the production of oil and gas.

According to the invention the degradation of polymers acting as viscosifying agents and therefore the reduction of the viscosity of the treatment fluid is significantly improved when an aliphatic azo-compound is used as breaker, especially when using water from natural sources that contain organic residues and high concentrations of salts.

Water Soluble Polymer

According to the instant invention, the water soluble polymer is a gelling polymer acting as viscosifying agent.

The water soluble gelling polymer used in the invention may be a natural based polymer or a synthetic polymer.

Natural based polymers according to this invention are macromolecules that are obtained from natural sources. They can be processed only physically but also be modified by chemical reaction.

Typically natural based polymers are polysaccharides or modified polysaccharides, for example starch or its derivatives, galactomannan gums, glucomannan gums, cellulosic derivatives, preferably carboxymethyl cellulose; cellulose ether, preferably hydroxyethyl cellulose; guar gums or its derivatives, preferably hydroxyalkyl guar, carboxyalkyl guar, and carboxyalkyl hydroxyalkyl guar or hydrophobically modified guar alginates, carrageenans, tragacanth gums, glucan gums and xanthan gums.

The natural based polymer can also be modified by grafted synthetic polymer chains.

Synthetic based polymers according to this invention are water soluble synthetic polymers acting as viscosifying agent, in particular such synthetic polymer material are synthetic polyacrylamide based polymers, copolymers or terpolymers.

Preferably, the synthetic polymer used in the instant invention is a synthetic polymer comprising:
(I) at least structural units of formula (I)

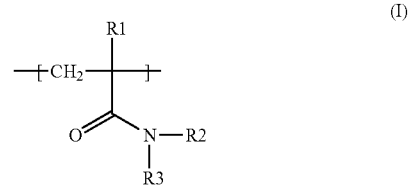

wherein
R1, R2 and R3 independently are hydrogen or $C_1$-$C_6$-alkyl,
(II) from 0 to 95% by weight structural units of formula (II)

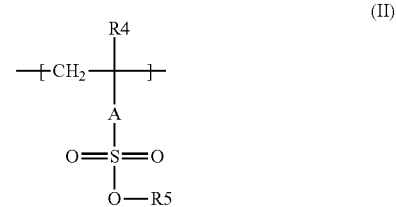

wherein
R4 is hydrogen or $C_1$-$C_6$-alkyl,
R5 is hydrogen, a cation of an alkaline metal, of an earth alkaline metal, of ammonia and/or of an organic amine,
A is a covalent C—S bond or a two-valent organic bridging group,
(III) from 0 to 95% by weight structural units of formula (III)

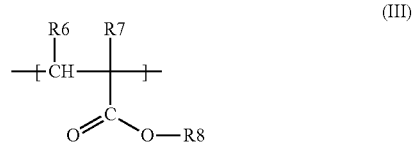

wherein
R6 and R7 are independently of one another hydrogen, $C_1$-$C_6$-alkyl, —COOR$_9$ or —CH$_2$—COOR$_9$, with R$_9$ being hydrogen, a cation of an alkaline metal, of an earth alkaline metal, of ammonia and/or of an organic amine,
R8 is hydrogen, a cation of an alkaline metal, of an earth alkaline metal, of ammonia and/or of an organic amine, or is $C_1$-$C_6$-alkyl, a group —$C_nH_{2n}$—OH with n being an integer between 2 and 6, preferably 2, or is a group —$C_oH_{2o}$—NR10R11, with o being an integer between 2 and 6, preferably 2, and
R10 and R11 are independently of one another hydrogen or $C_1$-$C_6$-alkyl, preferably hydrogen,
(IV) from 0 to 95% by weight structural units of formula (IV)

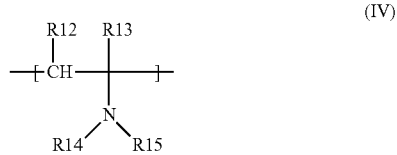

(IV)

wherein
R12 and R13 are independently of one another hydrogen, $C_1$-$C_6$-alkyl, —COOR16 or —CH$_2$—COOR16, with
R16 being hydrogen, a cation of an alkaline metal, of an earth alkaline metal, of ammonia and/or of an organic amine,
R14 is hydrogen or, $C_1$-$C_6$-alkyl, and
R15 is —COH, —CO—$C_1$-$C_6$-alkyl or
R14 and R15 together with the nitrogen atom to which they are attached form a heterocyclic group with 4 to 6 ring atoms, preferably a pyridine ring, a pyrrolidone ring or a caprolactame ring,
(V) from 0 to 20% by weight structural units of formula (V)

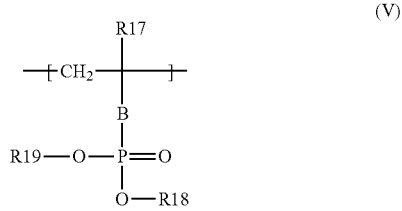

(V)

wherein
R17 is hydrogen or, $C_1$-$C_6$alkyl, and
R18 and R19 are independently of one another hydrogen, a cation of an alkaline metal, of an earth alkaline metal, of ammonia and/or of an organic amine,
B is a covalent C—P bond or a two-valent organic bridging group,
with the proviso that the percentage of the structural units of formulae (I) to (V) refer to the total mass of the copolymer and the percentage of the structural units of formulae (I) to (V) amounts to 100%.

The polymer used in the instant invention may further contain crosslinking monomers, which are monomers with more than one ethylenically unsaturated group. Different compound classes can be used, such as bis-amides, e.g. methylene-bis-acrylamide, bis-, tris- or tetraether derived from two-, three- or fourvalent alcohols and from ethylenically unsaturated halides e.g. trimethylolpropane diallylether, pentaerithriol-triallylether and tetrallyloxyethane, or esters of ethylenically unsaturated carboxylic acids with multivalent alcohol, e.g. di-, tri-, or tetraacrylates derived from ethyleneglycol, from trimethylolpropanol or from pentaerythrite, or di-, tri-, or polyamines which are substituted at the nitrogen atom with ethylenically unsaturated residues, such as N,N'-diallyl-ethylenediamine or triallylamine.

Crosslinker monomers, if present, typically are used in amounts between 0.01 and 5% by weight, preferably between 0.05 and 1% by weight, referring to the total amount of monomers used.

The $C_1$-$C_6$-alkyl groups being present may be straight-chain or branched. Examples of alkyl groups are methyl, ethyl, n-propyl, iso-propyl, n-butyl, sec.-butyl, tert.-butyl, n-pentyl or n-hexyl. Ethyl and especially methyl are preferred.

The group A may be a C—S-covalent bond or a two-valent organic group. Examples thereof are $C_1$-$C_6$-alkylene groups or —CO—$C_1$-$C_6$-alkylene groups. The alkylene groups may be straight-chain or branched. Examples of A groups are $C_pH_{2p}$— groups or —CO—NH—$C_pH_{2p}$— groups, with p being an integer between 1 and 6. —CO—NH—C(CH$_3$)$_2$—CH$_2$— or a C—S-covalent bond is a preferred group A.

The group B may be a C—P-covalent bond or a two-valent organic group. Examples thereof are $C_1$-$C_6$-alkylene groups. These groups may be straight-chain or branched. Examples of alkylene groups are —$C_qH_{2q}$— groups, with q being an integer between 1 and 6. Methylene or a C—P-covalent bond is a preferred group A.

The structural units of formula (I) are derived from an ethylenically unsaturated carboxylic acid amide selected from the group of acrylamide, methacrylamide and/or their N—$C_1$-$C_6$-alkyl derivatives or N,N—$C_1$-$C_6$-dialkyl derivatives.

Preferred polymers used in the instant invention further contain structural units of formula (II) to (V) which are derived from an ethylenically unsaturated sulfonic acid and/or its alkaline metal salts and/or their ammonium salts, from ethylenically unsaturated carboxylic acid and/or its alkaline metal salts and/or their ammonium salts, from N-vinylamides, and/or an ethylenically unsaturated phosphonic acid and/or its alkaline metal salts and/or their ammonium salts, optionally together with further copolymerisable monomers.

Other preferred copolymers used in the instant invention are those, wherein B is a C—P covalent bond or a —$C_qH_{2q}$— group with q being an integer between 1 and 6, preferably 1, and/or wherein A is a C—S covalent bond or a —CO—NH—$C_pH_{2p}$— group with p being an integer between 1 and 6, preferably between 2 and 4, B being most preferably a group —CO—NH—C(CH$_3$)$_2$—CH$_2$—.

Also preferably applied are copolymers with structural units of the formula (II) derived from vinylsulfonic acid, 2-acrylamido-2-methylpropane sulfonic acid, 2-methacrylamido-2-methylpropane sulfonic acid, styrene sulfonic acid and/or their alkaline metal salts and/or their ammonium salts. Especially preferred are structural units of the formula (II) derived from 2-acrylamido-2-methylpropane sulfonic acid and/or from 2-methacrylamido-2-methylpropane sulfonic acid and/or from their alkaline metal salts and/or from their ammonium salts.

Further preferably applied monomers which are optionally used in the manufacture of the copolymers are chosen from ethylenically unsaturated carboxylic acid and/or their derivatives of the formula (III), preferably chosen from the group of alkylesters from ethylenically unsaturated carboxylic acid, oxyalkylesters of ethylenically unsaturated carboxylic acid and/or esters of ethylenically unsaturated carboxylic acids with N-dialkylalkanolamines.

The ethylenically unsaturated carboxylic acids of the formula (III) are preferably acrylic acid, methacrylic acid, fumaric acid, maleic acid, itaconic acid and/or crotonic acid as well as their alkaline metal salts and/or their ammonium salts. The alkylesters of ethylenically unsaturated carboxylic acids are preferably alkylesters of acrylic acid, methacrylic acid, fumaric acid, maleic acid, itaconic acid and/or crotonic acid. Especially preferred are alkylesters with 1 to 6 carbon atoms.

The oxyalkylesters of an ethylenically unsaturated carboxylic acids of the formula (III) are preferably 2-hydroxy-ethylester of acrylic acid, methacrylic acid, fumaric acid, maleic acid, itaconic acid and/or crotonic acid.

The ester of ethylenically unsaturated carboxylic acid of the formula (III) with N-dialkylalkanolamine is preferably N,N-dimethylethanolamine methacrylate, its salt or quaternary ammonium product.

Further preferably applied copolymers with structural units of the formula (IV) are derived from N-vinylamides.

The N-vinylamide is preferably N-vinylformamide, N-vinylacetamide, N-vinyl-N-methylacetamide, or N-vinylamide comprising cyclic N-vinylamide groups, preferably derived from N-vinylpyrrolidone, N-vinylcaprolactame or N-vinylpyridine.

Preferably applied are copolymers with structural units of the formula (V) are derived from vinylphosphonic acid and/or its alkaline metal salts and/or its ammonium salts, and/or allylphosphonic acid and/or its alkaline metal salts and/or its ammonium salts.

Preferred copolymers used in the instant invention are those, wherein $R_1$, $R_2$, $R_3$, $R_4$, $R_{10}$, $R_{11}$, $R_{14}$, and $R_{17}$ are independently of one another hydrogen or methyl or wherein $R_5$, $R_9$, $R_{16}$, $R_{18}$ and $R_{19}$ are independently of one another hydrogen or a cation of an alkali metal, of an earth alkaline metal, of ammonia or of an organic amine.

Still other preferred copolymers used in the instant invention are those, wherein $R_6$ and $R_{12}$ is hydrogen and $R_7$ and $R_{13}$ is hydrogen or methyl, or wherein $R_6$ is —$COOR_9$ and $R_7$ is hydrogen or wherein $R_6$ is hydrogen and $R_7$ is —$CH_2$—$COOR_9$ or wherein $R_{12}$ is hydrogen and $R_{13}$ is hydrogen or methyl, or wherein $R_{12}$ is —$COOR_{16}$ and $R_{13}$ is hydrogen or wherein $R_{12}$ is hydrogen and $R_{13}$ is —$CH_2$—$COOR_{16}$.

The copolymer used in the instant invention may be linear or branched or crosslinked either by covalent or ionic crosslinking.

The polymers can be synthesized by various technologies, e.g. by inverse emulsion polymeriziation, gel polymerizaiton or precipitation polymerization.

A viscosified treatment fluid is prepared by dissolving a solid polymer or by diluting a polymer solution or by inverting a water-in-oil polymer emulsion using water or an aqueous solution.

The aqueous solution may contain salts such as NaCl, KCl, $CaCl_2$, $MgCl_2$, $NH_4Cl$, NaBr, KBr, sodium formate, sodium acetate, and others.

The aqueous solution may further contain water miscible solvent as alcohols, e.g. methanol, ethanol, n- and i-propanol, glycol.

The aqueous polymer solution may further contain additives that are necessary for the treatment. Those additives may include surfactants, biocides, clay inhibitors and/or corrosion inhibitors.

The concentration of the polymer is typically from 0.01 to 10% by weight, preferred from 0.05 to 5% by weight and most preferred from 0.2 to 2% by weight, referred to the aqueous polymer solution.

To increase the viscosity of the treatment fluid, the polymers may also be ionically crosslinked by multivalent metal ions or metal complexes selected from group IIIA, IVB, VB, VIB, IIVB and/or VIIIB of the periodic table of elements, preferably selected form the ions and/or complexes of zirconium, aluminium, titanium, boron, chromium and/or iron. Especially preferred are the ions and/or complexes of zirconium and titanium.

Typically water soluble salts of the multivalent metal ions are used. Suitable anions are e.g. halides, especially chloride, sulfate, lactate, citrate or gluconate. Also suitable are complexes of the multivalent metal ions with organic N- and O-compound, e.g. alcohols, di- and triols, mono-, di- and tri-carboxylic acids, mono-, di- and triamines and/or hydroxyalkylamines.

The quantity of transition metal compound for crosslinking the polymers ranges 0.1 to 50% by weight, preferred from 0.5 to 30%, more preferred from 1 to 20% by weight, referred to the total mass of polymer.

The transition metal compounds, e.g. the salts and/or complexes of transition metal cation, are dissolved and/or diluted in water or in a water miscible solvent, and then added to the polymer solution under stirring to ensure a homogenous distribution of transition metal cation in the solution. The crosslinking of the polymer chains can be retarded or speeded up by adaptation of the stirring speed, pH value and/or adjusting the temperature.

The viscosity of the viscosified fluids or of the crosslinked hydrogels prior to braking typically may range from about 5 mPas to several 1000 mPas.

Water

The water for preparing the polymer solution and the treatment fluid according to this invention can be fresh water, e.g. river water, or natural occurring brines like formation water, produced water and/or flow back from a well after a stimulation process and mixtures thereof.

The water for preparing the polymer solution and the treatment fluid may contain salts comprising mono-, di-, or trivalent cations and/or anions, non-limiting examples are lithium, sodium, potassium, strontium, ammonium, calcium, magnesium, barium, boron, aluminium, iron, fluoride, chloride, bromide, sulphate, carbonate, acetate, formate. TDS (total dissolved solids) may range from 50 ppm e.g. for fresh water, to 330 000 ppm for high saline brines. Preferably, the water used for preparing the viscosified treatment fluid contains at least 100 ppm TDS salts, preferred at least 1000 ppm, more preferred 10000 ppm.

The water for preparing the polymer solution and the treatment fluid may further contain organic residues from oil and/or gas, especially formation water, produced water and flow back. These organic residues may be completely dissolved or be present as a fine dispersion. Before adding further organic compounds as additives the water may contain from 0 to 5000 mg/l total organic carbon (TOC), preferably least 1 mg/l of TOC, more preferred at least 3 mg/l, more preferred at least 10 mg/l. A typical upper limit for the TOC is 500 mg/l, however, higher TOC of up to 5000 mg/l are possible.

Breaker Composition

According to the instant invention, the breaker composition contains at least one aliphatic azo-compound.

Preferred aliphatic azo compounds contain at least one aliphatic group with a tertiary C-atom connected to one N-atom of the azo group.

More preferred aliphatic azo-compound contain structural units of the formula

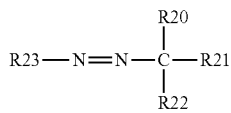

wherein
$R^{20}$ is $C_1$-$C_6$-alkyl group which may be straight-chain, branched or cyclic or cyano group,
$R^{21}$, $R^{22}$ are independent of each other a cyano-group and/or $C_1$-$C_6$-alkyl group which may be straight-chain, branched or cyclic, and/or contain amino, amide, amidine or carboxyl group and may be further substituted, or may form an aliphatic ring system,
$R^{23}$ is an aliphatic group, preferred a group of the formula

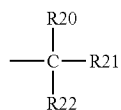

wherein
$R^{20}$ is $C_1$-$C_6$-alkyl group which may be straight-chain, branched or cyclic or cyano group,
$R^{21}$, $R^{22}$ are independent of each other a cyano-group and/or $C_1$-$C_6$-alkyl group which may be straight-chain, branched or cyclic, and/or contain amino, amide, amidine or carboxyl group and may be further substituted, or may form an aliphatic ring system.

Within the meaning of the instant invention, the term aliphatic means organic compounds and material which do not contain any aromatic groups.

The aliphatic azo compounds according to the present invention bear at least one aliphatic group at an azo-nitrogen, for example 2,2'-Azobis[2-(2-imidazolin-2-yl)propane], 2,2'-Azobis[2-(2-imidazolin-2-yl)propane]dihydrochloride, 2,2'-Azobis[2-(2-imidazolin-2-yl)propane] disulfate dihydrate, 2,2'-Azobis{2-[1-(2-hydroxyethyl)-2-imidazolin-2-yl]propane}dihydrochloride, 2,2'-Azobis(2-methyl propionamidine) dihydrochloride, 2,2'-Azobis[N-(2-carboxyethyl)-2-methylpropionamidine]hydrate, 2,2'-Azobis(1-imino-1-pyrrolidino-2-ethylpropane) dihydrochloride, 2,2'-Azobis[2-methyl-N-(2-hydroxyethyl) propionamide], 2,2'-Azobis{2-methyl-N-[1,1-bis(hydroxymethyl)-2-hydroxyethyl]propionamide}, 2,2'-Azobis(2,4-dimethyl valeronitrile), 2,2'-Azobis(4-methoxy-2,4-dimethyl valeronitrile), Dimethyl 2,2'-azobis(2-methylpropionate), 2,2'-Azobis(2-methylbutyronitrile) 2,2'-Azobis(isobutyronitrile), 1,1'-Azobis(cyclohexane-1-carbonitrile), 2,2'-Azobis[N-(2-propenyl)-2-methylpropionamide], 1-[(1-cyano-1-methylethyl)azo] formamide 2,2'-Azobis(N-butyl-2-methylpropionamide), 2,2'-Azobis(N-cyclohexyl-2-methylpropionamide), 4,4'-Azobis(4-cyanovaleric acid) or mixtures thereof.

Preferably, the breaker composition consists only of aliphatic azo-compound(s).

The breaker composition/aliphatic azo compounds forming the breaker composition can be added to the aqueous polymer solution as a solid or as a solution. For oil soluble aliphatic azo compound it is preferable to add a solution of the azo compound in a water miscible solvent to ensure a homogeneous distribution of the azo compound in the aqueous polymer solution, e.g. in methanol, ethanol isopropanol, acetone, N-methyl pyrrolidone, N,N-dimethyl formamide, dimethyl acetamide.

The concentration of the aliphatic azo compound ranges from 0.01 to 10% by weight, preferred from 0.1 to 2% by weight, most preferred from 0.15 to 1% by weight, referred to the total mass of the aqueous polymer solution.

Mixing of Viscosified Treatment Fluid and Breaker Composition

Typically the treatment fluid can be prepared by adding breaker and if wanted the crosslinker or their solutions to the solution of the gelling agent, such as polymer, in particular synthetic polymer material, under stirring to ensure a substantially homogeneous distribution of all ingredients within the treatment fluid. If necessary further additives can be present or can be added e.g. pH buffer material or other substances to adjust the pH value. The so prepared treatment fluid is then pumped into the formation.

The sequence of the addition of the crosslinker solution, the breaker or its solution, and, if necessary, further solutions of additives to the polymer solution can be varied. It is also possible to add them all simultaneously, e.g. continuously during pumping of the polymer solution into the formation.

It is preferred to add first the breaker to the aqueous polymer solution and then add the crosslinker solution and/or solutions of additives if necessary directly before introducing the treatment fluid into the formation.

For some applications the breaker or breaker solution can be added to the polymer solution or the polymer gel when the solution or the gel have already been introduced into the formation and, if required, have already stayed there for a given time.

After some time of close contact of the gelling agent, such as the polymer, and the breaker and activation system the polymer is degraded and the viscosity of the treatment fluid is reduced. The reduction of the viscosity is dependent on the conditions in the formation, e.g. temperature, pH, concentrations of polymer and breaker and of the time. It may depend on the application what degree of reduction of the viscosity is required.

A reduction of the viscosity of the treatment fluid by means of the activated breaker system is considered to be achieved (within the meaning of the instant invention) when within 2 hours a viscosity of 90% or less compared to the original viscosity is obtained, the viscosities determined under the exact experimental conditions. Thus, the interaction of viscosified treatment fluid and breaker composition causes a reduction of the viscosity of at least 10% within 60 minutes (determined as described before, such as exact experimental conditions).

The treatment fluid according to the invention is preferably injected into the formation at a temperature below 90° C., more preferred below 75° C.

Test Methods

The following testing methods are used:

Viscosity

The viscosity was determined using either a Brookfield RS3+ SST rheometer or a Fann 35 rheometer.

The Brookfield rheometer is a coaxial cylinder rotational viscometer equipped with a CC40 cell. 60 ml of the sample were poured into the viscometer cup and characterized at $100 \text{ s}^{-1}$ and 30° C.

The Fann 35 rheometer is a Couette type coaxial cylinder rotational viscometer, equipped with R1 rotor sleeve, B1 bob and F1 torsion spring.

120 ml of the sample were poured into the viscometer cup and characterized at 100 rpm and room temperature.

Abbreviations

HLB

HLB-value means the hydrophilic-lipophilic balance of a surfactant and is a measure of the degree to which it is hydrophilic or lipophilic, determined by calculating values for the different regions of the molecule. There are different methods to calculate the HLB-value. The most common results in a ranking of the surfactants between 0 and 20 with 0 correspond to a completely lipophilic/hydrophobic molecule, and a value of 20 corresponds to a completely hydrophilic/lipophobic molecule. Typically the suppliers specify the HLB-value of the surfactant.

TDS

TDS means total dissolved solids. The concentration is typically given in g/kg or mg/kg=ppm.

TOC

TOC means total organic carbon. The concentration is typically given in mg/l.

The following examples illustrate the invention without limiting it.

EXAMPLES

Example 1: Preparation of a Polymer Via Inverse Emulsion Polymerization 37 g sorbitan monooleate were dissolved in 160 g $C_{11}$-$C_{16}$ isoparaffin. 100 g water in a beaker were cooled to 5° C., then 50 g 2-acrylamido-2-methylpropane sulfonic acid and 10 g vinylphosphonic acid were added. The pH was adjusted to 7.1 with aqueous ammonia solution. Subsequently 223 g acryl amide solution (60 weight % in water) were added.

Under vigorous stirring the aqueous monomer solution was added to the isoparaffin mixture. The emulsion was then purged for 45 min with nitrogen.

The polymerization was started by addition of 0.5 g azoisobutyronitrile in 12 g isoparaffin and heated to 50° C. To complete the reaction the temperature was increased to 80° C. and maintained at this temperature for 2 hours. The polymer emulsion was cooled to room temperature. As product, a viscous fluid was obtained.

Example 2: Preparation of a Polymer Via Gel Polymerization 400 ml deionized water and 9.2 ml 25 weight-% aqueous ammonia solution were placed in a reaction vessel. 70 g acryl amide and 30 g acrylic acid were added under stirring. The solution was purged with nitrogen and heated to 50° C. The polymerization was started by addition of 5 ml of a 20% by weight aqueous solution of ammonium persulfate. To complete the reaction the temperature was increased to 80° C. and maintained at this temperature for 2 hours. After cooling to room temperature a highly viscous gel was obtained.

Example 3

800 ml of tab water and 8 g of a non-ionic surfactant with a HLB of about 13 were mixed in a Waring blender. 14 g of the polymer emulsion of example 1 were added and mixed for 4 min. The viscosity of the linear gel prior to breaking was determined using the Brookfield rheometer at 100 s$^{-1}$ and 30° C. The starting viscosity was 142 mPas.

To 200 g of the so prepared polymer solution the breaker was added, the quantities given in table 1. The sample was put into a sealed glass flask and heated to 82° C. without stirring for 4 h. Then the bottles were allowed to cool to room temperature and the viscosity of the broken fluid was determined using the same conditions as described above. The results are given in table 1.

TABLE 1

| Example | breaker | Quantity, [gram] | Viscosity, [mPas] |
|---|---|---|---|
| 3a, comparative | 2,5-dimethyl-2,5-di(2-ethylhexanoyl peroxy) hexane | 0.15 | 68 |
| 3b, comparative | sodium persulfate | 0.15 | <5 |
| 3c | 2,2'-azobis(isobutyronitrile) | 0.15 | 86 |
| 3d | 2,2'-azobis(isobutyronitrile) | 0.30 | 82 |

It is obvious that sodium persulfate is the most active breaker in a polymer solution using water free from salt and organic impurities coming from oil or gas.

It is further obvious that an aliphatic azo compound added to the polymer solution leads to a degradation of the polymers and therefore to reduced viscosities of the polymer solution. The results are similar to breaker like peroxides that are described in the literature.

Example 4

Original formation water containing about 4.2% sodium, 0.1% potassium, 0.1% strontium, 0.5% calcium, 0.1% magnesium, 7.2% chloride, 0.1% bromide, 0.1% sulphate, others 0.2%, the total dissolved solids (TDS) being 12.5%, % given as weight percent referred to quantity of the formation water, is used in this example The total organic carbon content (TOC) is 310 mg/l.

800 ml of this formation water and 8 g of a non-ionic surfactant with a HLB of about 13 were mixed in a Waring blender. 22 g of the polymer emulsion of example 1 were added and mixed for 10 min. The viscosity of the linear gel prior to breaking was determined using the Brookfield rheometer at 100 s$^{-1}$ and 30° C. The starting viscosity was 76 mPas.

To 200 g of the so prepared polymer solution the breaker was added, the quantities given in table 2. The sample was put into a sealed glass flask and heated to 82° C. without stirring for 2 h. Then the bottles were allowed to cool to room temperature and the viscosity of the broken fluid was determined using the same conditions as described above. The results are given in table 2.

TABLE 2

| Example | breaker | Quantity, [gram] | Viscosity, [mPas] |
|---|---|---|---|
| 4a, comparative | sodium persulfate | 0.4 | >76 |
| 4b | 2,2'-azobis(isobutyronitrile) | 0.4 | 65 |
| 4c | 1,1'Azobis-(cyclohexane-1-carbonitrile) | 0.6 | 64 |
| 4d | 2,2'-azobis(2-methylpropion amidine)*2 HCl | 0.6 | 65 |

The results clearly show that the most common oxidative breaker sodium persulfate completely fails to degrade the polymer and to reduce the viscosity of the polymer solution in an original formation water containing organic residues.

Example 5

4.1 g of the polymer gel of example 2 were diluted with 200 ml tab water and thoroughly mixed. The viscosity of the polymer solution was 89 mPas, determined using the Brookfield rheometer at 25° C. and 100 s$^{-1}$.

Then breaker or breaker system was added, the quantities given in table 3.

The polymer solution was placed in bottles, sealed and put into a water bath at 82° C. without stirring. After 1.5 h the bottles were allowed to cool to room temperature and the viscosity of the broken fluid was determined using the same conditions as for the starting polymer solution.

TABLE 3

| Example | Breaker | Quantity, g | Viscosity, mPas |
|---|---|---|---|
| 5a | 2,2'-azobis(isobutyronitrile) | 0.6 | 64 |
| 5b | 2,2'-azobis(2-methylpropion amidine)*2 HCl | 0.4 | 58 |
| 5c | 1,1'Azobis-(cyclohexane-1-carbonitrile) | 0.6 | 59 |

Example 6

1 l original formation water from example 4 was treated with 10 g charcoal for 1 h and then filtered. The TOC was reduced by this treatment from 310 mg/l to 18 mg/l.

800 ml of this formation water and 8 g of a non-ionic surfactant with a HLB of about 13 were mixed in a Waring blender. 22 g of the polymer emulsion of example 1 were added and mixed for 10 min. The viscosity of the linear gel prior to breaking was determined using the Fann 35 rheometer at 100 rpm at room temperature. The starting viscosity was 71 mPas, the pH before adding the breaker was 7.

To 200 g of the so prepared polymer solution the breaker was added, the quantities given in table 4. The sample was put into a sealed glass flask and heated to 82° C. without stirring for 2 h. Then the bottles were allowed to cool to room temperature and the viscosity of the broken fluid was determined using the same conditions as described above. The results are given in table 4.

TABLE 4

| Example | Breaker | Quantity [gram] | Viscosity [mPas] | pH |
|---|---|---|---|---|
| 6a comparative | sodium persulfate | 0.4 | 59 | 2 |
| 6b | 2,2'-azobis(isobutyronitrile) | 0.4 | 64 | 7 |
| 6c | 1,1'Azobis-(cyclohexane-1-carbonitrile) | 0.6 | 57 | 7 |
| 6d | 2,2'-azobis(2-methylpropion amidine)*2 HCl | 0.6 | 60 | 7 |

The results clearly show that persulfate breaker is strongly affected by TOC generated by dissolved or finely dispersed organic residues from oil and gas as typically present in produced water or flow back. In contrast the azo breaker are essentially unaffected by organic residues and gives reproducible results independent from TOC content.

In addition, the results show that the azo breaker does not influence the pH of the treatment fluid during breaking as sodium persulfate does.

Example 7

200 ml original formation water from example 4 were filled into a blender. 2 g of a non-ionic surfactant with a HLB of about 13 were added and mixed in a Waring blender. 3.5 g of the polymer emulsion of example 1 were added and mixed for 10 min. The pH is adjusted to 4-5 using 10% acetic acid. Then 0.5 g 2,2'-azobis(isobutyronitrile) and 0.2 g Zr triethanolamine complex are added under stirring. After about 60 s a viscous gel is formed that could be lifted easily from the beaker using a glass rod. The viscosity determined by a Brookfield rheometer was >1200 mPas.

The crosslinked gel was placed in a flask equipped with a stirrer and heated to 82° C. for 3.5 h. The polymer gel degraded to give a viscous liquid.

The viscosity was 290 mPas at 100 s$^{-1}$ at 30° C. in the Brookfield rheometer.

A very strong crosslinked polymer gel can be degraded to obtain a broken fluid with low viscosity.

The invention claimed is:

1. A method of reducing the viscosity of a viscosified treatment fluid in natural gas and/or oilfield stimulation processes comprising the steps of:
   (i) providing a viscosified treatment fluid containing a water soluble polymeric gelling agent wherein the viscosified treatment fluid is prepared using natural occurring brines selected from the group consisting of formation water, produced water and/or flow back from a well after a stimulation process, and mixtures thereof, wherein the natural occurring brine has a total organic carbon (TOC) in the range of 310-5000 mg/l and a total dissolved solids (TDS) salt of at least 10,000 ppm, the water soluble polymeric gelling agent including at least structural units of formula (I)

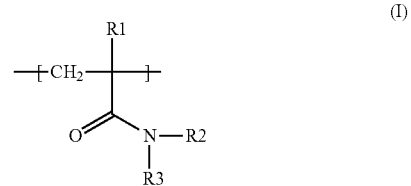

wherein
R1, R2 and R3 independently are hydrogen or $C_1$-$C_6$-alkyl,
up to 95% by weight of the water soluble polymeric gelling agent of structural units of formula (II)

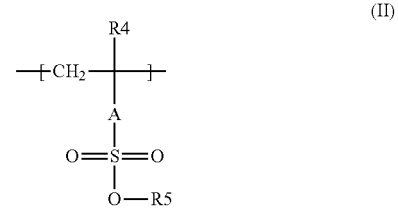

wherein
R4 is hydrogen or $C_1$-$C_6$-alkyl,

R5 is hydrogen, a cation of an alkaline metal, of an earth alkaline metal, of ammonia and/or of an organic amine, A is a covalent C—S bond or a two-valent organic bridging group, and up to 20% by weight of the water soluble polymeric gelling agent of structural units of formula (V)

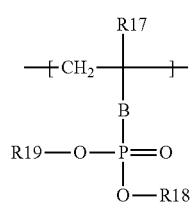

wherein

R17 is hydrogen or, $C_1$-$C_6$-alkyl, and

R18 and R19 are independently of one another hydrogen, a cation of an alkaline metal, of an earth alkaline metal, of ammonia and/or of an organic amine, B is a covalent C—P bond or a two-valent organic bridging group, (ii) providing a breaker composition containing an aliphatic azo-compound selected from the group consisting of: 2,2'-Azobis[2-(2-imidazolin-2-yl)propane], 2,2'-Azobis[2-(2-imidazolin-2-yl)propane]dihydrochloride, 2,2'-Azobis[2-(2-imidazolin-2-yl)propane] disulfate dihydrate, 2,2'-Azobis{2-[1-(2-hydroxyethyl)-2-imidazolin-2-yl]propane}dihydrochloride, 2,2'-Azobis(2-methyl propionamidine) dihydrochloride, 2,2'-Azobis[N-(2-carboxyethyl)-2-methylpropionamidine]hydrate, 2,2'-Azobis(1-imino-1-pyrrolidino-2-ethylpropane)dihydrochloride, 2,2'-Azobis[2-methyl-N-(2-hydroxyethyl)propionamide], 2,2'-Azobis{2-methyl-N-[1,1-bis(hydroxymethyl)-2-hydroxyethl]propionamide}, 2,2'-Azobis(2.4-dimethyl valeronitrile), 2,2'-Azobis(4-methoxy-2.4-dimethyl valeronitrile), Dimethyl 2,2'-azobis(2-methylpropionate), 1,1'-Azobis(cyclohexane-1-carbonitrile), 2,2'-Azobis[N-(2-propenyl)-2-methylpropionamide], 1-[(1-cyano-1-methylethyl)azo]formamide 2,2'-Azobis(N-butyl-2-methylpropionamide), 2,2'-Azobis(N-cyclohexyl-2-methylpropionamide), and mixtures thereof, (iii) mixing said viscosified treatment fluid and said breaker composition and injecting the mixture of viscosified treatment fluid and breaker composition into a natural gas or oil reservoir, (iv) allowing said viscosified treatment fluid and said breaker composition to interact whereby the viscosity of the viscosified treatment fluid is reduced.

2. The method of claim 1 wherein a concentration of the aliphatic azo compound ranges from 0.01 to 10% by weight, of the total mass of the aqueous polymer solution.

3. The method of claim 1 wherein the viscosified treatment fluid is injected at a temperature below 90° C.

4. The method of claim 1 wherein the viscosified treatment fluid is injected as hydraulic fracturing fluid.

5. A method of stimulating a natural gas and/or oil reservoir comprising the steps of:

(i) providing a viscosified treatment fluid containing a water soluble polymeric gelling agent wherein the viscosified treatment fluid is prepared using natural occurring brines selected from the group consisting of formation water, produced water and/or flow back from a well after a stimulation process, and mixtures thereof, wherein the natural occurring brine has a total organic carbon (TOC) in the range of 310-5000 mg/I and a total dissolved solids (TDS) salt of at least 10,000 ppm, the water soluble polymeric gelling agent including at least structural units of formula (I)

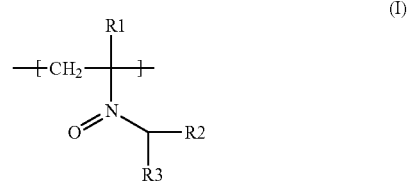

wherein

R1, R2 and R3 independently are hydrogen or $C_1$-$C_6$-alkyl, up to 95% by weight of the water soluble polymeric gelling agent of structural units of formula (II)

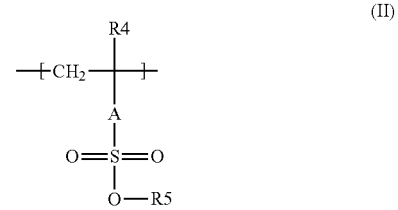

wherein

R4 is hydrogen or $C_1$-$C_6$-alkyl,

R5 is hydrogen, a cation of an alkaline metal, of an earth alkaline metal, of ammonia and/or of an organic amine, A is a covalent C—S bond or a two-valent organic bridging group, and up to 20% by weight of the water soluble polymeric gelling agent of structural units of formula (V)

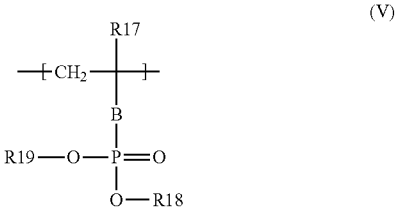

wherein

R17 is hydrogen or, $C_1$-$C_6$-alkyl, and

R18 and R19 are independently of one another hydrogen, a cation of an alkaline metal, of an earth alkaline metal, of ammonia and/or of an organic amine, B is a covalent C—P bond or a two-valent organic bridging group, (ii) providing a breaker composition containing an aliphatic azo-compound selected from the group consisting of: 2,2'-Azobis[2-(2-imidazolin-2-yl)propane], 2,2'-Azobis[2-(2-imidazolin-2-yl)propane]dihydrochloride, 2,2'-Azobis[2-(2-imidazolin-2-yl)propane] disulfate dihydrate, 2,2'-Azobis{2-[1-(2-hydroxyethyl)-2-imidazolin-2-yl]propane}dihydrochloride, 2,2'-Azobis(2-methyl propionamidine) dihydrochloride, 2,2'-Azobis[N-(2-carboxyethyl)-2-methylpropionamidine]hydrate, 2,2'-Azobis(1-imino-1-pyrrolidino-2-ethylpropane)dihydrochloride, 2,2'-Azobis[2-methyl-N-(2-hydroxyethyl)propionamide], 2,2'-Azobis{2-methyl-N-[1,1-bis(hydroxymethyl)-2-hydroxyethl]propionamide}, 2,2'-Azobis(2.4-dimethyl valeronitrile), 2,2'-Azobis(4-methoxy-2.4-dimethyl valeronitrile), Dimethyl 2,2'-azobis(2-methylpropionate), 1,1'-Azobis(cyclohexane-1-carbonitrile), 2,2'-Azobis[N-(2-propenyl)-2-methylpropionamide], 1-[(1-cyano-1-methylethyl)azo]formamide 2,2'-Azobis(N-butyl-2-methylpropionamide), 2,2'-Azobis(N-cyclohexyl-2-methylpropionamide), and mixtures thereof, (iii) mixing said viscosified treatment fluid and said breaker composition and injecting the mixture of viscosified treatment fluid and breaker composition into a natural gas or oil reservoir, (iv) allowing said viscosified treatment fluid and said breaker composition to interact whereby the viscosity of the viscosified treatment fluid is reduced, (v) removing the viscosity reduced fluid from step (iv) from the natural gas or oil reservoir.

6. A method for the production of oil and/or natural gas which includes the stimulation of the natural gas and/or oil reservoir by the steps of:

(i) providing a viscosified treatment fluid containing a water soluble polymeric gelling agent wherein the viscosified treatment fluid is prepared using natural occurring brines selected from the group consisting of formation water, produced water and/or flow back from a well after a stimulation process, and mixtures thereof, wherein the natural occurring brine has a total organic carbon (TOC) in the range of 310-5000 mg/l and a total dissolved solids (TDS) salt of at least 10,000 ppm, the water soluble polymeric gelling agent including at least structural units of formula (I)

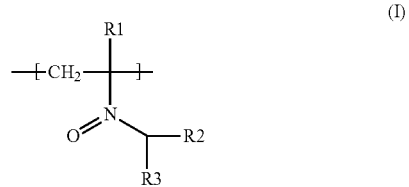

(I)

wherein

R1, R2 and R3 independently are hydrogen or $C_1$-$C_6$-alkyl, up to 95% by weight of the water soluble polymeric gelling agent of structural units of formula (II)

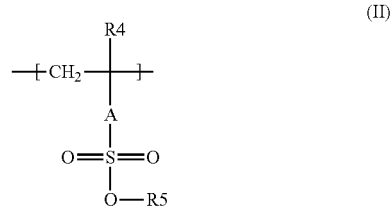

(II)

wherein

R4 is hydrogen or $C_1$-$C_6$-alkyl,

R5 is hydrogen, a cation of an alkaline metal, of an earth alkaline metal, of ammonia and/or of an organic amine, A is a covalent C—S bond or a two-valent organic bridging group, and up to 20% by weight of the water soluble polymeric gelling agent of structural units of formula (V)

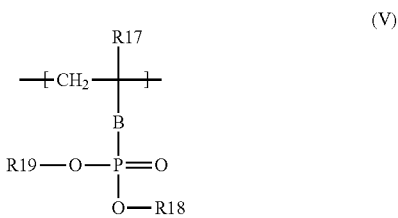

(V)

wherein

R17 is hydrogen or, $C_1$-$C_6$-alkyl, and

R18 and R19 are independently of one another hydrogen, a cation of an alkaline metal, of an earth alkaline metal, of ammonia and/or of an organic amine, B is a covalent C—P bond or a two-valent organic bridging group, (ii) providing a breaker composition containing an aliphatic azo-compound selected from the group consisting of: 2,2'-Azobis[2-(2-imidazolin-2-yl)propane], 2,2'-Azobis[2-(2-imidazolin-2-yl)propane]dihydrochloride, 2,2'-Azobis[2-(2-imidazolin-2-yl)propane] disulfate dihydrate, 2,2'-Azobis{2-[1-(2-hydroxyethyl)-2-imidazolin-2-yl]propane}dihydrochloride, 2,2'-Azobis(2-methyl propionamidine) dihydrochloride, 2,2'-Azobis[N-(2-carboxyethyl)-2-methylpropionamidine]hydrate, 2,2'-Azobis(1-imino-1-pyrrolidino-2-ethylpropane)dihydrochloride, 2,2'-Azobis[2-methyl-N-(2-hydroxyethyl)propionamide], 2,2'-Azobis{2-methyl-N-[1,1-bis(hydroxymethyl)-2-hydroxyethl]propionamide}, 2,2'-Azobis(2.4-dimethyl valeronitrile), 2,2'-Azobis(4-methoxy-2.4-dimethyl valeronitrile), Dimethyl 2,2'-azobis(2-methylpropionate), 1,1'-Azobis(cyclohexane-1-carbonitrile), 2,2'-Azobis[N-(2-propenyl)-2-methylpropionamide], 1-[(1-cyano-1-methylethyl)azo]formamide 2,2'-Azobis(N-butyl-2-methylpropionamide), 2,2'-Azobis(N-cyclohexyl-2-methylpropionamide), and mixtures thereof, (iii) mixing said viscosified treatment fluid and said breaker composition and injecting the mixture of viscosified treatment fluid and breaker composition into a natural gas or oil reservoir, (iv) allowing said viscosified treatment fluid and said breaker composition to interact whereby the viscosity of the viscosified treatment fluid is reduced, (v) removing the viscosity reduced fluid from step (iv) from the natural gas or oil reservoir.

\* \* \* \* \*